United States Patent Office 3,426,237
Patented Feb. 4, 1969

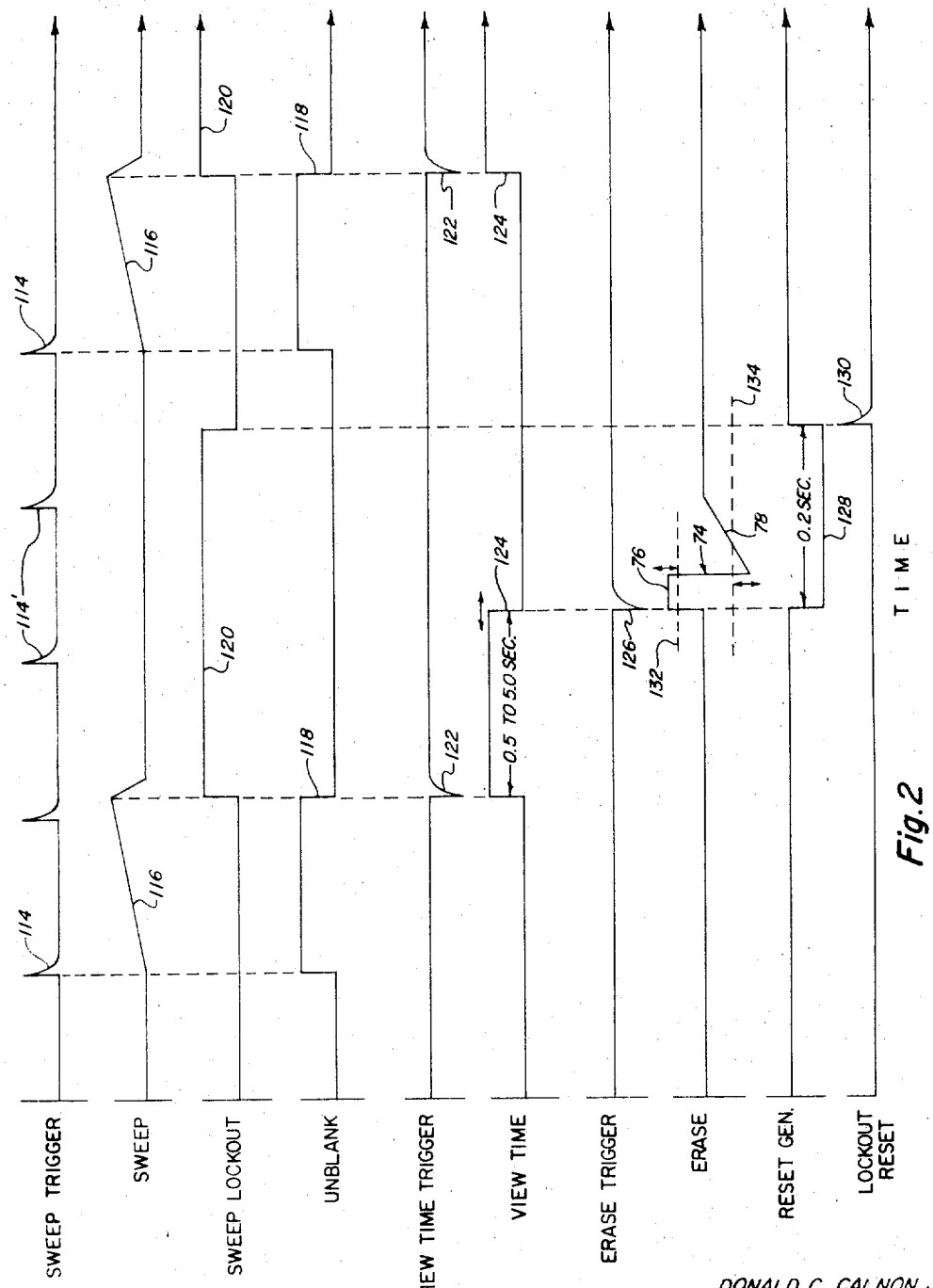

3,426,237
AUTOMATIC ERASE CIRCUIT FOR STORAGE TUBE
Donald C. Calnon, Jr., Beaverton, and Russell V. Fillinger, Melvin A. Holznagel, and Richard W. Stack, Portland, Oreg., assignors to Tektronix, Inc., Beaverton, Oreg., a corporation of Oregon
Filed Aug. 23, 1965, Ser. No. 481,770
U.S. Cl. 315—12                 9 Claims
Int. Cl. H01j 29/41

ABSTRACT OF THE DISCLOSURE

An automatic erase circuit for a direct viewing storage tube is described in which the erase pulse is generated in response to the end of the horizontal sweep signal after a predetermined time delay. The time delay provides a viewing time during which a light image produced by the storage tube corresponding to the stored charge image, may be viewed. The viewing time as well as the amplitude limits of the erase pulse may be varied, as may be the quiescent voltage level of the storage target electrode to which the erase pulse is applied. A lockout circuit is provided for applying a lockout signal to the sweep generator to prevent it from producing a sweep signal during such viewing time and such erase pulse. The lockout circuit includes a bistable multivibrator for generating the lockout signal which is triggered at the end of the previous sweep signal and reverted after the end of the erase pulse.

---

Figure 1:
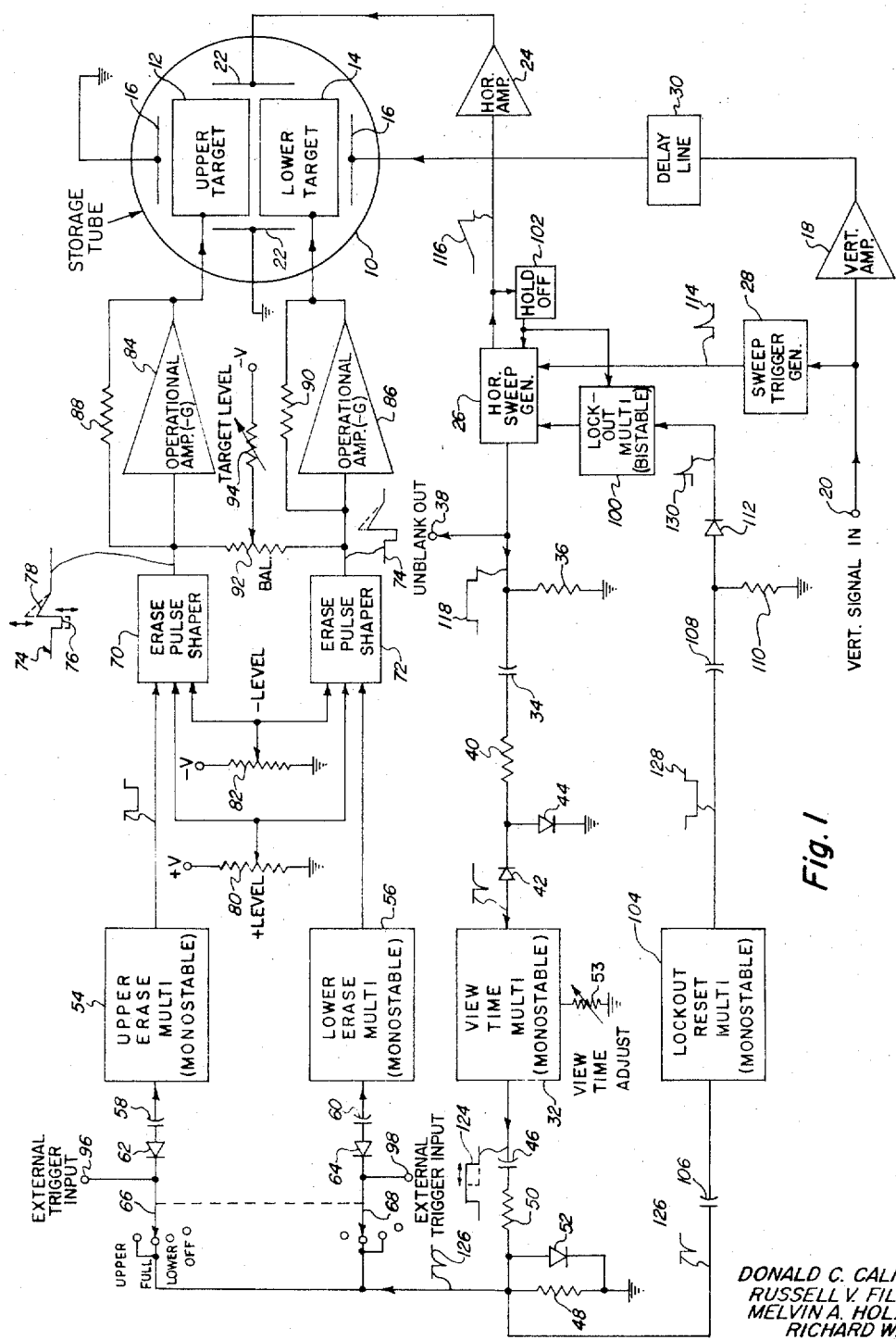

The subject matter of the present invention relates generally to charge image storage apparatus and in particular to an electrical circuit for automatically preventing the forming of additional traces on a storage target of a storage tube after a charge image has been formed thereon and for automatically erasing such image and conditioning the target for storage of another image after a predetermined time delay. This storage tube may be of the bistable direct-viewing type and the automatic erase circuit of the present invention is provided with a means for adjusting the time during which the charge image is stored on such tube before it is automatically erased in order to provide a variable viewing time for such tube.

The automatic erase circuit of the present invention is especially useful in a cathode ray oscilloscope employing a storage tube as a display device to display the waveform of the vertical input signal applied to such oscilloscope, but may also be used in radar and sonar apparatus having such a storage tube. The present erase circuit is triggered by a voltage produced in the deflection circuits of the oscilloscope at the end of a charge image storage operation to initiate a view time during which no further trace is applied to the storage target. The triggering may thus occur at the end of a horizontal sweep signal but the triggering may be responsive to any other voltage or voltage level present at the end of a charge storage operation, for example, during X–Y operation of the oscilloscope. Such erase circuit automatically produces an erase pulse at the end of the view time referred to above, and applies the erase pulse to the storage target of the storage tube to erase the charge image formed thereon. While the present automatic erase circuit can be employed with many different types of storage targets, it has been used successfully with the "split screen" type storage target disclosed in copending U.S. patent application Ser. No. 214,877 filed Aug. 6, 1962 by R. H. Anderson, now U.S. Patent 3,214,631, as well as with a slightly modified version of this split screen storage target employing a dot pattern phosphor storage dielectric and mesh shaped target electrodes, similar to that shown in copending U.S. application Ser. No. 299,422 filed Aug. 1, 1963 by C. B. Gibson, Jr., now U.S. Patent 3,293,474.

There are several advantages which are obtained by the automatic erase circuit of the present invention, including simpler and faster erasing of the charge image which helps the oscilloscope operator to set up the waveform display which is to be examined on the storage tube by enabling him to adjust the vertical sensitivity switch and horizontal sweep speed switch to the proper positions more quickly. Such erase circuit also frees the operator's hands and enables him to move a test probe applying the vertical input signal to such oscilloscope between different test points on the circuit under test more conveniently while viewing the signal produced at such test points. In addition, the present automatic erase circuit, enables several successive waveforms of a repetitive vertical input signal to be stored and erased until the best stored image of such waveform is obtained, at which point such erase circuit may be turned off to continue to store such image for further study. Another advantage in the present circuit is that the time delay between the start of the view time and the generation of the erased pulse can be adjusted, which enables the viewing time of the storage apparatus to be varied to suit the preference of the oscilloscope operator. This allows more complex signal waveforms to be stored for a longer time before automatic erasure to enable a more careful study than is required of input signals having simpler waveforms. In an oscilloscope having a triggered sweep such as that of the specific example shown herein, the operation of the automatic erase circuit can be triggered at the end of the horizontal sweep voltage, and in this case, the erase pulse is synchronized with the sweep signal and any premature erasing of the charge image before it is completely formed is avoided.

It is, therefore, one object of the present invention to provide an automatic erase circuit for a storage tube which enables simpler and faster operation of such tube.

Another object of the present invention is to provide an automatic erase circuit for a storage tube which is triggered to produce an erase pulse in response to the application of a vertical input signal to such tube to synchronize such erase pulse with such input signal.

A further object of the present invention is to provide a triggered erase circuit for a direct-viewing storage tube which initiates a viewing time upon application of a trigger pulse to such circuit and which produces an erase pulse after an adjustable time delay to enable the viewing time to be changed for different stored images.

An additional object of the invention is to provide an automatic view time and erase circuit for a storage tube in a cathode ray oscilloscope which is triggered automatically to enable the waveform display desired to be set up more quickly and to free the operator's hands for movement of a test probe coupling the vertical input signal to such oscilloscope.

Other objects and advantages of the present invention will be apparent from the following detailed description of a preferred embodiment thereof and from the attached drawings of which:

FIG. 1 is a block diagram of one embodiment of the automatic erase circuit of the present invention as it may be used in a cathode ray oscilloscope; and FIG. 2 is a diagram of signal waveforms produced by the circuit of FIG. 1, such waveforms being shown in time relationship to one another.

As shown in FIG. 1, an automatic erase circuit in accordance with the present invention is connected to a storage tube 10 which may be a bistable direct-viewing type storage tube of the type shown in copending U.S. patent application Ser. No. 214,877 referred to above, whose storage target is split horizontally into two independently operated portions. This is accomplished by providing an upper target electrode 12 insulatingly spaced from a lower target electrode 14 so that different D.C. voltages may be applied simultaneously to such electrodes during the formation of a charge image on the storage target to enable the storage dielectric areas above such target electrodes to operate independently in a storage or nonstorage mode. These target electrodes may be thin, light transparent, electrically conductive layers of tin oxide or other suitable material coated on the face plate of the storage tube beneath a storage phosphor layer which functions as the storage dielectric as well as the fluorescent screen of such tube. A pair of vertical deflection plates 16 are provided in the storage tube with at least one of such plates connected to the output of a vertical amplifier 18 whose input is connected to the vertical signal input terminal 20 of the cathode ray oscilloscope employing such storage tube as its display device.

The storage tube 10 is also provided with a pair of horizontal deflection plates 22, at least one of which is connected to the output of a horizontal amplifier 24 whose input is connected to one output of a horizontal sweep generator 26. This horizontal sweep generator may be of a conventional Miller integrator type which is triggered by the output trigger pulse of a sweep trigger generator 28, whose input is connected to the vertical signal input terminal 20 so that such trigger pulse is produced in response to the receipt of a vertical input signal. In the event that a triggered sweep generator is employed, a signal delay line 30 may be provided in the vertical deflection system to enable the horizontal sweep signal to be applied to the horizontal deflection plates at the same time that the vertical input signal is applied to the vertical deflection plates. It should be noted that electromagnetic deflection coils can be employed in place of electrostatic deflection plates to provide the electron beam deflection means of the storage tube, however, the latter is preferable for high frequency oscilloscope operation. Also a free-running horizontal sweep generator can be employed when a periodic vertical input signal is being examined, in which case the sweep trigger generator 28 and the delay line 30 may be eliminated.

The charge image of the vertical input signal waveform is "written" on the storage dielectric over the upper and lower target electrodes 12 and 14 by deflection of the electron beam within tube 10 by the signals applied to the horizontal and vertical deflection plates. This charge image is stored in a conventional manner by bombardment of the storage dielectric with low velocity flood electrons to cause secondary electron emission from such storage dielectric in a conventional manner when the D.C. voltages applied to the target electrodes are of the proper value. In order to erase the charge image stored on such storage dielectric, the voltage of the target electrode is increased to a more positive voltage above the "fade positive" potential of the target which is greater than the first crossover voltage of the secondary emission characteristic curve of the storage dielectric, in order to enable the flood electrons to charge the storage dielectric to a uniform potential. Then the target voltage is decreased to a more negative voltage below the "retention threshold" potential which is less than the first crossover voltage and below which bistable storage is not possible. Finally, the target voltage is then raised gradually back to its quiescent voltage above the retention threshold potential but below the fade positive potential, so that another charge image can be stored on the storage target. Previously this erase operation has been done by manually operating a switch which caused an erase voltage to be applied to the storage target. This manual erasure has several disadvantages, as indicated previously.

The specific automatic erase circuit shown includes a view time multivibrator 32 which may be of the monostable type having its input connected to the unblanking signal output of the horizontal sweep generator through a differentiating circuit including a coupling capacitor 34 and a shunt resistor 36 connected between the input terminal of such capacitor and ground. The horizontal sweep generator produces a positive rectangular unblanking voltage which is initiated at the start of the sweep signal and terminates at the end of such sweep signal. This unblanking signal is transmitted to an output terminal 38 which may be connected to the control grid of the electron gun used to form the writing beam in storage tube 10, in order to enable such writing beam to strike the storage target during the time the sweep signal is applied to the horizontal deflection plates by overcoming a quiescent negative bias voltage on such grid which prevents such beam from striking the storage target at other times. This positive unblanking signal is differentiated to produce a positive spike pulse corresponding to the leading edge of such unblanking signal and a negative spike pulse corresponding to its trailing edge, and these spike pulses are transmitted through a coupling resistor 40 connected between the output terminal of capacitor 34 and the common connection at the cathode of a coupling diode 42 and at the anode of a clipping diode 44. The cathode of clipping diode 44 is grounded so that such diode transmits the positive spike pulse to ground, while the anode of coupling diode 42 is connected to the input of the view time multivibrator 32 to transmit the negative spike pulse to the multivibrator in order to trigger such multivibrator at a time corresponding to the end of the unblanking signal.

The output terminal of the view time multivibrator 32 is connected through another differentiating circuit including a coupling capacitor 46 and a shunt resistor 48 connected to the output of such capacitor through a coupling resistor 50, such shunt resistor having a clipping diode 52 connected across it to shunt positive spike pulses to ground. When it is triggered the view time multivibrator 32 produces a positive rectangular view time signal whose width may be adjusted by varying the setting of a variable resistor 53 or other suitable control element in such multivibrator. This view time signal is differentiated to produce a positive spike corresponding to its leading edge and a negative spike corresponding to the end of such signal by the differentiating network including capacitor 46, such positive spike being bypassed to ground by clipping diode 52 and such negative spike being employed as an erase trigger pulse.

An upper erase multivibrator 54 and a lower erase multivibrator 56, which may be of a similar monostable type, are provided with their inputs each connected respectively, through a coupling capacitor 58 and 60, a coupling diode 62 and 64, and a pair of switches 66 and 68 to the output of the differentiating circuit including capacitor 46. The movable contacts of switches 66 and 68 are ganged and each of such switches is provided with four fixed contacts to connect the view time multivibrator to one or both of the erase multivibrators through the differentiating circuit including capacitor 46 to trigger such erase multivibrators by the erase trigger pulse at the end of the view time signal. Thus in the "Upper" position of the switches the upper erase multivibrator 54 is connected to the view time multivibrator 32 while the lower erase multivibrator 56 is disconnected, in the "Full" position of the switches both of these erase multivibrators are connected to such view time multivibrator, and in the "Lower" position of the switches the upper erase multivibrator 54 is disconnected while the lower erase multivibrator is connected to the view time multivibrator. Switches 66 and 68 enable an erase pulse to be applied to either the upper target electrode 12 or the lower target electrode 14 or both to erase any charge image on the storage dielectric above such target area.

The negative spike pulse produced by the termination of the view time signal is transmitted through coupling diodes 62 and 64 to trigger the erase multivibrators 54 and 56. The output terminals of the upper erase multivibrator 54 and the lower erase multivibrator 56 are connected, respectively, to conventional erase pulse shaper circuits 70 and 72 which may be like that shown in U.S. Patent 2,967,969 or a diode gated capacitor circuit of conventional type. The erase pulse shaper circuits both produce an erase pulse 74 in the form of a current signal having a negative going rectangular portion 76 followed by a positive going triangular portion 78. The triangular portion 78 of the erase pulse may be produced by discharging a capacitor after termination of the rectangular output pulse of the erase multivibrator, and is added to the end of such output pulse to provide the erase pulse 74. The positive and negative maximum amplitude limits of the erase pulses may be varied as indicated by arrows, by changing the settings of potentiometers 80 and 82, whose movable contacts are connected to both of the pulse shaping circuits. The changes in maximum amplitude levels of the erase pulse enable the use of the automatic erase circuit of the present invention with different types of storage tubes whose targets have different fade positive potentials and retention threshold potentials.

The outputs of the erase pulse shaper circuits 70 and 72 are respectively connected through operational amplifiers 84 and 86 to the upper target electrode 12 and the lower target electrode 14. Each of the operational amplifiers 84 and 86 includes a high gain voltage inverter amplifier and has a negative feedback resistor 88 and 90, respectively, connected between its input and output terminals. The operational amplifiers convert the current signal erase pulse 74 produced by the pulse shaper circuits into a voltage signal of reverse polarity before applying such erase pulse to the target electrodes. In addition, such operational amplifiers prevent any changes of target voltage, such as may be produced during electrical readout, from being transmitted to the erase pulse shaper and erase multivibrator circuits because the D.C. voltage level at the input of such operational amplifiers always remains substantially constant.

As stated previously, each of the target electrodes 12 and 14 is provided with a quiescent D.C. target voltage of about +300 volts. This may be accomplished by means of a balance potentiometer 92 having its end terminals connected between the inputs of the operational amplifiers 84 and 86 and having its movable contact connected through a variable resistor 94 to a source of negative D.C. supply voltage. Thus, the setting of the variable resistor 94 determines the quiescent D.C. voltage level of the storage target electrodes 12 and 14, while the setting of the balance potentiometer 92 assures that the same D.C. voltage is applied to both target electrodes.

It should be noted that it would be possible to use the same erase multivibrator and erase pulse shaper as a common erase pulse generator connected to both the upper target electrode and the lower target electrode if the selector switches 66 and 68 were connected to the output of such pulse shaper circuit. However, this presumes that it is always desired to erase both target electrodes at the same time in the "Full" position of such switches. In some cases this is not true, since it is desirable to erase the storage target areas corresponding to the upper and lower target electrodes 12 and 14 at different times to enable the storage and rapid erase of two signals occurring at slightly different times. This can be accomplished by means of external trigger pulses applied at different times to a pair of external trigger input terminals 96 and 98, respectively connected to the upper erase multivibrator 54 and the lower erase multivibrator 56.

A lockout multivibrator 100 of the bistable type is provided with its output connected to the horizontal sweep generator 26 to prevent such sweep generator from being retriggered when such lockout multivibrator is producing an output signal. One input terminal of the lockout multivibrator is connected to the output of a conventional holdoff circuit 102 connected between the output of the horizontal sweep generator and its sweep gating multivibrator (not shown). One such sweep generator having a holdoff circuit and a sweep gating multivibrator is shown in U.S. Patent 3,061,788. The holdoff signal is a ramp signal which corresponds to the ramp shaped sweep signal except for having a longer retrace portion. When the holdoff signal reaches a certain predetermined level, which occurs at some time during the linear positive rise of the sweep signal, the holdoff signal causes the sweep lockout multivibrator 100 to change to the state in which it prevents retriggering of the sweep generator. The lockout multivibrator is reverted by a delay circuit which may include a lockout reset multivibrator 104 of a monostable type whose input is connected through a coupling capacitor 106 to the output of the integrator circuit including capacitor 46. This lockout reset multivibrator 104 is triggered by the negative spike trigger pulse corresponding to the end of the viewing time signal produced by the viewing time multivibrator, to cause a negative rectangular lockout reset generator pulse to be produced at the output of such reset multivibrator. This negative reset generator pulse if differentiated by a coupling capacitor 108 and a shunt resistor 110 connected to the output of the reset multivibrator 104 to produce negative and positive spike pulses corresponding to the leading and trailing edges of such output signal. A coupling diode 112 is connected between the output of the differentiating circuit and the input of the lockout multivibrator 100 in order to transmit the positive spike corresponding to the end of the rest generator signal as a reset pulse to such lockout multivibrator in order to revert the lockout multivibrator. The reversion of the lockout multivibrator 100 terminates the lockout signal and enables the horizontal sweep generator 26 to again be triggered by the sweep trigger generator 28.

The operation of the automatic erase circuit of FIG. 1 can be more easily understood from the signal waveforms shown in FIG. 2. Thus, as shown in FIG. 2 a sweep trigger pulse 114 produced by the sweep trigger generator 28 causes the horizontal sweep generator 26 to produce a ramp shaped sweep signal 116 and a rectangular unblanking signal 118. When the sweep signal 116 and corresponding holdoff signal reaches a predetermined value, the lockout multivibrator changes its state and produces a positive rectangular sweep lockout signal 120. At the same time the sweep signal 116 and the unblanking signal 118 are terminated. A negative spike shaped view time trigger pulse 122 is produced at the end of the unblanking pulse by differentiating such blanking pulse and this view time trigger pulse is employed to trigger the view time multivibrator 32 to produce a positive rectangular view time pulse 124 whose width may be adjusted between about 0.5 and 5.0 seconds by adjusting resistor 53.

By differentiating the view time signal 124, a negative going erase trigger pulse 126 is produced at the end of such view time signal and such trigger pulse is applied to the upper and lower erase multivibrators 54 and 56 as well as the lockout reset multivibrator 104 which produce the erase pulses 74 and a negative rectangular reset generator signal 128, respectively. The duration of the erase pulse 74 and the reset generator signal are both fixed with the width of the reset generator signal being slightly greater than that of the erase pulse, for example, about 0.2 second to insure that the charge image is completely erased before a new charge image can be produced on the storage target. The reset generator signal 128 is differentiated to produce a positive going lockout reset pulse 130 at the end of such signal, which is transmitted to the lockout multivibrator 100 to revert such multivibrator and terminate the sweep lockout signal 120. It should be noted that sweep trigger pulses 114' would ordinarily trigger the sweep generator except for the sweep lockout signal 120 which prevents this from happening until after the erase pulse 74 has terminated.

As stated previously, the maximum amplitude of the positive rectangular portion 76 and the negative triangular portion 78 of the erase pulse 74 as seen at the output of the operational amplifiers 84 and 86, are adjusted to accommodate for variation of storage target characteristic due to the use of different types of targets, ageing, etc. The positive rectangular portion 76 of the erase pulse drives the voltage of the target electrodes above the fade positive potential 132 to enable the flood electrons to erase the charge image while the negative rectangular portion 76 of such pulse drives the voltage of the target electrodes below the retention threshold potential 134 before returning the target voltage to its normal quiescent level.

It will be obvious to those having ordinary skill in the art that many changes may be made in the details of the above-described preferred embodiment of the present invention without departing from the spirit of the invention. For example, in some oscilloscopes two sweep generators are employed with one sweep signal being used to delay the generation of the sweep signal of the other generator for a predetermined controllable time. Such oscilloscope can employ the automatic erase circuit of the present invention except that additional logic circuit is required to insure that the view time multivibrator 32 is triggerd in response to the end of the one sweep signal which is the last to terminate.

Therefore, the scope of the present invention should only be determined by the following claims.

We claim:
1. An automatic erase circuit for a storage tube, comprising:
    deflection means including a deflection signal generator, for supplying deflection signals to the electron beam deflection means of said tube to cause the formation of a charge image on the storage target of said tube;
    an erase pulse generator;
    trigger means connected between an output of said deflection signal generator and the input of the erase pulse generator for triggring said erase pulse generator in response to the termination of said deflection signals to produce an erase pulse at a predetermined time after said charge image has been formed and to cause said erase pulse to be applied to said storage target to erase said charge image; and
    disabling means for applying a disabling pulse to said deflection signal genrator for the duration of said erase pulse to prevent the deflection signal generator from applying a deflection signal to the storage tube and to prevent the formation of a subsequent charge image on said storage target until after the termination of said erase pulse.

2. An automatic erase circuit for a storage tube, comprising:
    deflection circuits for supplying deflection signals to the horizontal and vertical deflection means of said tube to cause the formation of a charge image on the storage target of said tube;
    lockout means responsive to the level of a signal in one of the deflection circuits when said charge image has been formed, for applying a lockout pulse to said one deflection circuit to prevent the formation of another charge image on said storage target during said lockout pulse; and
    erase means for producing an erase pulse during said lockout pulse after a time delay to enable viewing of the stored charge image, and for applying said erase pulse to said storage target to erase said charge image.

3. An automatic erase circuit for a direct viewing storage tube, comprising:
    deflection circuits for supplying deflection signals to the horizontal and vertical deflection means of said tube to cause the formation of a charge image on the storage target of said tube;
    lockout means for applying a lockout pulse to one of the deflection circuits to prevent it from applying another deflection signal to said tube and to prevent the formation of another charge image on said storage target during said lockout pulse;
    erase means for producing an erase pulse during the time of said lockout pulse after a time delay to enable viewing of the stored charge image, and for applying said erase pulse to said storage target to erase said charge image and to condition said storage target to store another charge image;
    and trigger means for triggering said lockout means and said erase means in response to a deflection signal in said one deflection circuit reaching a predetermined level when the charge image has been formed.

4. An automatic erase circuit for a storage tube, comprising:
    a sweep generator for producing a time base sweep signal and applying said sweep signal to one deflection means of the storage tube when an input signal is applied to the other deflection means of said tube to cause the formation of a charge image of said input signal on the storage target of said tube;
    an erase pulse generator for applying erase pulses to said storage tube to erase said charge image;
    trigger means for triggering said erase pulse generator to produce an erase pulse in response to termination of the sweep signal after a time delay; and
    lockout means for applying a lockout signal to the sweep generator in response to the termination of said sweep signal to prevent the sweep generator from producing another sweep signal until after the termination of said erase pulse.

5. An automatic erase circuit for a storage tube, comprising:
    a sweep generator for producing a horizontal sweep signal and applying said sweep signal to the horizontal deflection means of the storage tube when a vertical input signal is applied to the vertical deflection means of said tube to cause the formation of a charge image on the storage target of said tube;
    an erase pulse generator for applying erase pulses to said storage target to erase the charge image;
    trigger means for triggering said erase pulse generator to produce an erase pulse in response to the end of said sweep signal after a predetermined time delay, and said triggering means including means for adjusting the duration of said predetermined time delay; and
    lockout means for generating a lockout pulse in response to an output of said trigger means, and for applying said lockout signal to said sweep generator to prevent the sweep generator from producing another sweep signal until after the termination of said erase pulse.

6. An automatic erase circuit for a storage tube, comprising:
    a sweep generator for producing a horizontal sweep signal which is applied to the horizontal deflection means of the storage tube when a vertical input signal is applied to the vertical deflection means of said tube to cause the formation of a charge image on the storage target of said tube;
    an erase pulse generator for applying erase pulses to said storage target to erase said charge image;
    trigger means connected between the input of said erase pulse generator and the output of said sweep generator, for triggering said erase pulse generator to produce an erase pulse in response to the termination of said sweep signal after a predetermined time delay;
    level adjustment means for varying the maximum and minimum amplitude levels of said erase pulse; and
    lockout means for generating a lockout pulse in response to an output of said trigger means, and for applying said lockout signal to said sweep generator to prevent the sweep generator from producing another sweep signal until after the termination of said erase pulse.

7. An automatic erase circuit for a direct-viewing storage tube, comprising:
- a sweep generator for producing a horizontal sweep signal which is applied to the horizontal deflection means of the storage tube to cause the formation of a charge image on the storage target of said tube when a vertical input signal is applied to the vertical deflection means of said tube;
- trigger means including a view time multivibrator having at least one stable state connected to said sweep generator, for producing a trigger pulse at a predetermined time after the end of said sweep signal to enable the charge image to be stored on said target and viewed for said predetermined time before erasing said charge image;
- an erase pulse generator having at least one stable state connected to said trigger means so that said erase pulse generator is triggered by said trigger pulse to produce an erase pulse;
- an operational amplifier circuit including a voltage inverter amplifier having a negative feedback resistance, connected to the output of said erase pulse generator for transmitting said erase pulse to a storage target electrode in said storage tube; and
- lockout means for preventing the sweep generator from producing another sweep signal until after the termination of said erase pulse, said lockout means including a lockout reset miltivibrator having at least one stable state connected to said view time multivibrator and a lockout multivibrator having two stable states connected between said sweep generator and said reset multivibrator to trigger said lockout multivibrator in response to said sweep signal and to revert said lockout multivibrator in response to a reset trigger pulse produced by said reset multivibrator at a predetermined time after the termination of said erase pulse.

8. An automatic erase circuit for a storage tube having a storage target including a plurality of independently operated storage dielectric portions with separate insulated target electrodes, comprising;
- a sweep generator for producing a horizontal sweep signal which is applied to the horizontal deflection means of the storage tube when a vertical input signal is applied to the vertical deflection means of said tube to cause the formation of a charge image on the storage target of said tube;
- erase pulse generator means for producing erase pulses in response to the receipt of trigger pulses;
- trigger means connected between said erase pulse generator means and said sweep generator, for producing a trigger pulse at a predetermined time after the end of said sweep signal to enable the charge image to be stored on said target for said predetermined time before erasing said charge image, and for adjusting the duration of said predetermined time;
- a plurality of operational amplifiers connected between said erase pulse generator means and different ones of said target electrodes for transmitting said erase pulse to said target electrodes to erase said charge image;
- switch means for selectively connecting said target electrodes to an erase pulse generator which is triggered by said trigger means to apply erase pulses to the selected target electrode; and
- lockout means for preventing the sweep generator from producing another sweep signal until after the termination of said erase pulse.

9. An automatic erase circuit for a storage tube having a storage target including a plurality of independently operated storage dielectric portions with separate insulated target electrodes, comprising:
- a sweep generator for producing a horizontal sweep signal which is applied to the horizontal deflection means of the storage tube when a vertical input signal is applied to the vertical deflection means of said tube to cause the formation of a charge image on the storage target of said tube;
- a plurality of triggered erase pulse generators having means for adjusting the maximum amplitude of the erase pulses produced thereby;
- trigger means including a monostable view time multivibrator connected to said sweep generator, for producing a trigger pulse at a predetermined time after the end of said sweep signal to enable the charge image to be stored on said target for said predetermined time before erasing said charge image, said trigger means including means for adjusting the duration of said predetermined time;
- a plurality of switch means for selectively connecting said erase pulse generators to said trigger means to enable said erase pulse generators to be triggered by said trigger pulse to produce erase pulses;
- a plurality of operational amplifiers connected between the outputs of said erase pulse generators and different ones of said target electrodes for transmitting said erase pulses to said target electrodes to erase said charge image; and
- lockout means for preventing the sweep generator from producing another sweep signal until after the termination of said erase pulse, said lockout means including a bistable lockout multivibrator having its output connected to said sweep generator and a input connected to trigger said lockout multivibrator at the end of said sweep signal, and a monostable reset multivibrator connected between said view time multivibrator and said lockout multivibrator to revert said lockout multivibrator at a predetermined time after the end of said erase pulse.

References Cited

UNITED STATES PATENTS

| 2,843,798 | 7/1958 | Hook | 315—12 |
| 2,843,799 | 7/1958 | Hook et al. | 315—12 |
| 2,967,969 | 1/1961 | Stocker | 315—12 |

RODNEY D. BENNETT, *Primary Examiner.*

C. E. WANDS, *Assistant Examiner.*